United States Patent
Goodman et al.

(10) Patent No.: US 6,491,275 B1
(45) Date of Patent: Dec. 10, 2002

(54) COMPUTER ACCESSORY HAVING ASSEMBLAGE OF MOUSE PAD AND PAPER PAD

(76) Inventors: Kenneth Goodman, 21 Church St., Weymouth, MA (US) 02189; William Callahan, 50 Webster St., Weymouth, MA (US) 02190

( * ) Notice: Subject to any disclaimer, the term of this patent is extended or adjusted under 35 U.S.C. 154(b) by 132 days.

(21) Appl. No.: 09/309,694

(22) Filed: May 11, 1999

(51) Int. Cl.⁷ .............................................. B32B 3/24
(52) U.S. Cl. ................... 248/346.01; 248/918
(58) Field of Search ................... 248/918, 346.01, 248/118.1; 108/25, 26; 206/576; D19/78, 95, 99, 100

(56) References Cited

U.S. PATENT DOCUMENTS

| | | | |
|---|---|---|---|
| D203,724 S | * 2/1966 | Zandelin | ................. D19/76 |
| 4,354,601 A | * 10/1982 | Harrison | ................. 108/25 |
| 5,022,170 A | * 6/1991 | House | ................. 40/358 |
| 5,098,128 A | 3/1992 | Husta | |
| 5,405,168 A | 4/1995 | Holt | |
| 5,490,710 A | 2/1996 | Dearing et al. | |
| 5,533,697 A | 7/1996 | Fletcher et al. | |
| 5,542,637 A | 8/1996 | Schriner | |
| 5,692,815 A | 12/1997 | Murphy | |
| 5,820,968 A | * 10/1998 | Kurani | ................. 248/346.01 |
| D400,924 S | * 11/1998 | Cornell et al. | ................. D19/78 |
| D403,312 S | * 12/1998 | O'Brien et al. | ................. D14/114 |
| 5,952,070 A | * 9/1999 | Depiero | ................. 248/346.01 |
| 5,971,340 A | * 10/1999 | Murphy | ................. 248/346.01 |
| 5,990,870 A | * 11/1999 | Chen et al. | ................. 345/163 |

* cited by examiner

Primary Examiner—Ramon O. Ramirez
Assistant Examiner—Jon Szumny
(74) Attorney, Agent, or Firm—Morse, Altman & Martin

(57) ABSTRACT

A handy computer accessory provides a mouse pad, which is cut out to provide an opening, and a paper pad in the opening. The paper pad consists of a stack of repositionable pressure sensitive adhesive sheets. When needed, the paper pad is visually and manually accessible to a computer operator. Graphics on the mouse pad and paper pad are functional and/or aesthetic. A used paper pad may be replaced easily by removing any residual backing and pressing a replacement paper pad into the opening in the mouse pad.

5 Claims, 2 Drawing Sheets

COMPUTER ACCESSORY HAVING ASSEMBLAGE OF MOUSE PAD AND PAPER PAD

BACKGROUND OF THE INVENTION

1. Field of the Invention

The present invention relates to mouse pads and paper pads, and, more particularly, to mouse pads of the type that provide a surface for frictional contact with a computer mouse, and paper pads that are composed of a stack of repositionable sheets for the reception of hand-written notes or other visual matter.

2. The Prior Art

Mouse pads, per se, are well known computer accessories that provide a surface for frictional contact with a hand-operated computer mouse for interaction with the graphical user interface (GUI) of the computer. Many computer applications enable the entry of keyboard-driven electronic notes for such purposes as reminders, notices, remarks, references, etc. Such electronic notes sometimes either are not permitted or are too unwieldy for use in connection with the particular computer application being run. Small paper pads of pressure sensitive sheets are widely available for use in a myriad of situations in which handwritten notes are convenient to create and to affix at desired locations either permanently or temporarily. Oftentimes, attention is so focused when using a computer, that there may be inherent frustration when shifting attention between: the locations of small objects such as mouse pads and paper pads on the physical desktop (on which the computer rests); and the locations of small icons on the virtual desktop (of the computer screen). Facilitation is to be desired.

SUMMARY OF THE INVENTION

The primary object of the present invention is to provide a handy computer accessory in which a mouse pad and a paper pad are structurally integrated and operationally coordinated. The mouse pad is a planar unit, which generally includes a lower elastomeric foam base and an upper fibrous face, and which is cut out within its planar periphery to provide a receptacle in the form of an opening that has a profile of predetermined size and shape. The paper pad is a planar unit, which generally includes a stack of repositionable pressure sensitive sheets, and which has a profile of substantially the same predetermined size and shape as the opening in the mouse pad has. The paper pad is press fitted into the opening in which it is retained snugly. The paper pad and the opening thus are geometrically congruent. In one embodiment, the mouse pad and the paper pad have registered graphics that provide matching indicia or a seamless background design.

BRIEF DESCRIPTION OF THE DRAWINGS

For a fuller understanding of the nature and objects of the present invention, reference is made to the following specification, which is to be taken in connection with the accompanying drawings, wherein.

DETAILED DESCRIPTION OF PREFERRED EMBODIMENTS

Figure 1:
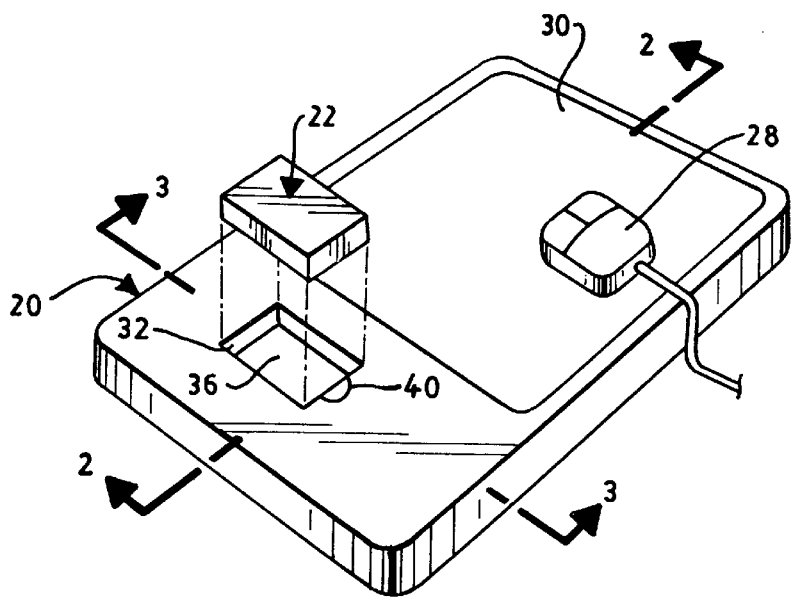
FIG. 1 is an exploded view in perspective of a paper pad and mouse pad assemblage embodying the present invention.
Figure 4:
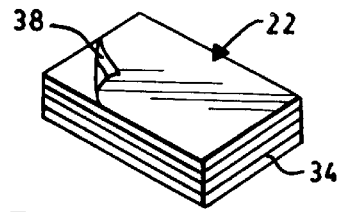
FIG. 4 is a perspective view of the paper pad of FIG. 1.
Figure 2:
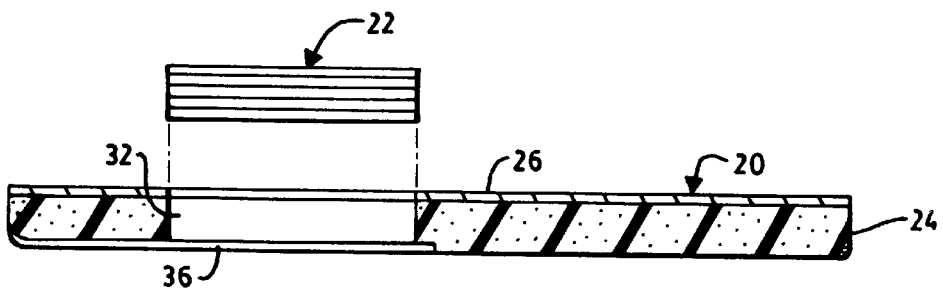
FIG. 2 is a cross-sectional view of the assemblage of FIG. 1, taken along the line 2—2 of FIG. 1.
Figure 3:
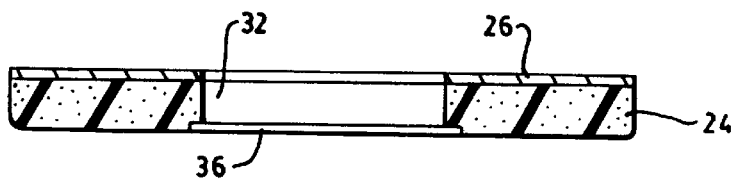
FIG. 3 is a cross-sectional view of the assemblage of FIG. 1, taken along the line 3—3 of FIG. 1.

FIGS. 1 to 4 illustrate a preferred embodiment of a computer accessory of the present invention as comprising a handy combination in which a mouse pad 20 and a paper pad 22 are structurally integrated and operationally coordinated.

Mouse pad 20 is a planar or plate-like unit, which generally includes a lower elastomeric foam base 24 and an upper fibrous face 26. Face 26 provides a frictional surface on which a mouse 28 is adapted to be moved. In one form, mouse 28 includes a contact ball that rolls in accordance with the movement of the mouse on the mouse pad. In another form, mouse 28 includes an optical detector (not shown) and an optical sight (not shown) for coaction with a contact area 30 on the mouse pad. In either case, movement of mouse 28 is translated to movement of an arrow or other indicator on the graphic user interface of a computer.

As shown, mouse pad 20 has a cutout 32 for the reception of paper pad 22. Paper pad 22 includes a stack of sheets 34. Cutout 32 constitutes a receptacle that has a planar profile of predetermined size and shape. The paper pad is a planar unit that is provided with a profile of substantially the same predetermined size and shape as does the window in the mouse pad. The paper pad is press fitted into the opening in which it is retained snugly. The paper pad and the opening thus are geometrically congruent. A web 36 that spans the back of cutout 32 limits movement of paper pad 22 into the cutout. In one form, the dimensions of this web are only sufficient to overlap the edges of the cutout. In another form, the dimensions of this web are sufficient to provide a backing for the entire mouse pad.

Each of sheets 34 has a front face that is adapted to receive pencil or pen notations, and a back face that, along at least one of its edges, has a band 38 of coating of repositionable pressure sensitive adhesive. In one form, this repositionable pressure sensitive adhesive is of the type sold under the trade designation, "Post-it" by Minnesota Mining and Manufacturing Corporation. An example of this type of adhesive is disclosed in the following patent, which is incorporated herein by reference: U.S. Pat. No. 5,795,636, issued Aug. 18, 1998, in the names of Janet T. Keller, et. al. for "Positionable and repositionable adhesive article". This patent defines "positionable" as meaning "an adhesive or pressure sensitive adhesive that can be placed against a substrate surface and easily slid over the surface into proper position without preadhering or sticking the adhesive article; pressure is generally required to adhere the adhesive article to the substrate". This patent defines "repositionable" as meaning "an adhesive or pressure sensitive adhesive" being "one that can be applied and adhered to a substrate and then removed and reapplied without distorting, defacing, or destroying the film, adhesive, or substrate".

Figure 5:
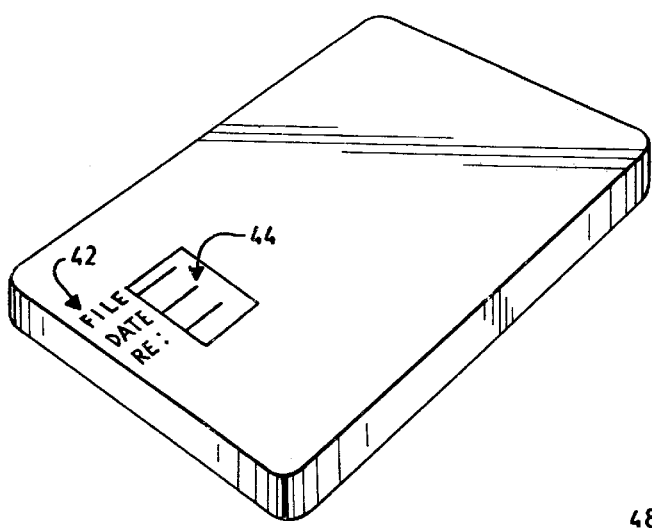
FIG. 5 is a perspective view of paper pad and mouse pad assemblage having graphics in accord the present invention.
Figure 6:
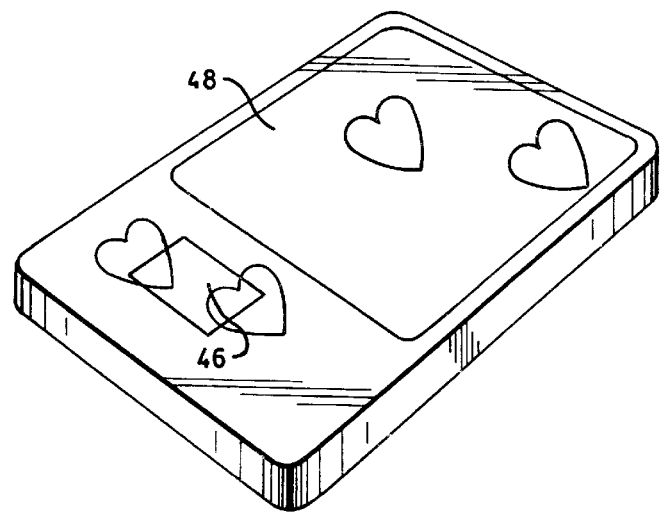
FIG. 6 is a perspective view of another paper pad and mouse pad assemblage having graphics in accordance with the present invention.
Figure 7:
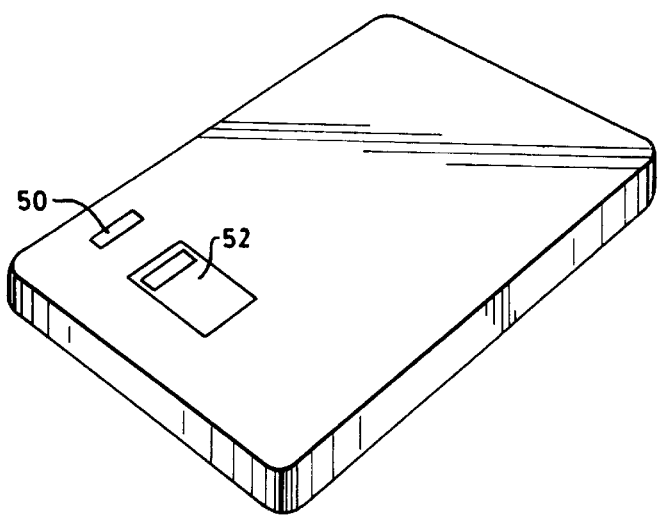
FIG. 7 is a perspective view of a further paper pad and mouse pad assemblage having graphics in accordance with the present invention.

In a preferred embodiment, the mouse pad and the paper pad have registered graphics that provide matching indicia. FIG. 5, illustrates the mouse pad as having along an edge of the cutout, a listing 42 of string variables, and illustrates each sheet of the paper pad as having a listing 44 of indicated areas to encourage consistent manual entry of information. FIG. 6 illustrates a decorative motif that blends the upper surfaces 46, 48 of the paper pad and the mouse pad to produce a seamless design. FIG. 7 illustrates an organization of indicia 50 on the mouse pad and indicia 52 on each sheet of the paper pad, which indicia are identically matched.

OPERATION

In operation, a computer operator uses mouse 28 in a conventional manner within bounds that are outside of cutout 32 and paper pad 22. When needed, the paper pad is visually and manually accessible. Graphics on the mouse pad and paper pad are functional and/or aesthetic. A used paper pad may be replaced easily by removing any residual backing and pressing a replacement paper pad into the cutout of the mouse pad. A finger notch 40, which tapers downwardly from the front to the back of the mouse pad and inwardly from the body of the mouse pad toward the cutout and the paper pad, facilitates removal of the sheets of the mouse pad, one at a time.

What is claimed is:

1. A computer accessory comprising a mouse pad and a paper pad, said mouse pad and said paper pad being structurally integrated and operationally coordinated:

(a) said mouse pad being a plate-like unit including a lower elastomeric foam base and an upper fibrous face;

(b) said face providing a frictional surface that includes a contact area on which a mouse is adapted to be moved;

(c) said mouse pad having a cutout adjacent to said contact area for the reception of said paper pad;

(d) said paper pad including a stack of sheets;

(e) said cutout constituting a receptacle that has a planar profile of predetermined size and shape;

(f) said paper pad being a planar unit that is provided with a profile of substantially the same predetermined size and shape as has said cutout;

(g) said paper pad being press fitted into said cutout;

(h) said paper pad and said cutout being geometrically congruent;

(i) a web that spans the back of said cutout and limits movement of said paper pad into said cutout;

(j) said sheets being characterized by a front face that is adapted to receive written notations, and a back face that, along at least one of its edges, has a band of coating of repositionable pressure sensitive adhesive;

(k) said repositionable pressure sensitive adhesive being applicable and adherent to a substrate, and then removable and re-applicable to a substrate;

(l) the upper face of said contact area and the upper face of said pad presenting a substantially continuous manually accessible surface;

(m) said substantially continuous manually accessible surface being adapted for immediate alternative contact by a hand or a mouse controlled thereby.

2. A computer accessory comprising a mouse pad and a paper pad, said mouse pad and said paper pad being structurally integrated and operationally coordinated:

(a) said mouse pad being a plate-like unit including a lower elastomeric foam base and an upper fibrous face;

(b) said face providing a frictional surface that includes a contact area on which a mouse is adapted to be moved;

(c) said mouse pad having a cutout adjacent to said contact area for the reception of said paper pad;

(d) said paper pad including a stack of sheets;

(e) said cutout constituting a receptacle that has a planar profile of predetermined size and shape;

(f) said paper pad being a planar unit that is provided with a profile of substantially the same predetermined size and shape as has said cutout;

(g) said paper pad being press fitted into said cutout;

(h) said paper pad and said cutout being geometrically congruent;

(i) a web that spans the back of said cutout and limits movement of said paper pad into said cutout;

(j) said sheets being-characterized by a front face that is adapted to receive written notations, and a back face that, along at least one of its edges, has a band of coating of repositionable pressure sensitive adhesive;

(k) said repositionable pressure sensitive adhesive being applicable and adherent to a substrate, and then removable and re-applicable to a substrate;

(l) said mouse pad and said paper pad having registered and contiguous graphics that provide matching indicia;

(m) the upper face of said contact area and the upper face of said pad presenting a substantially continuous manually accessible surface;

(n) Said substantially manually accessible surface being adapted for immediate alternative contact by a hand or a mouse controlled thereby.

3. The computer accessory of claim 2 wherein said mouse pad has along an edge of said cutout, a listing of string variables, and said paper pad has in registration therewith a listing of indicated areas to encourage consistent manual entry of information.

4. The computer accessory of claim 2 having a decorative motif that blends the upper surfaces of said paper pad and said mouse pad to produce a seamless design.

5. The computer accessory of claim 2 wherein indicia on said mouse pad and indicia on each sheet of said paper pad are identically matched.

* * * * *